(12) United States Patent
Auernheimer et al.

(10) Patent No.: US 10,292,409 B2
(45) Date of Patent: *May 21, 2019

(54) SYSTEM AND METHOD FOR COOKING PIECES OF PROTEIN

(71) Applicant: SUGAR CREEK PACKING CO., Hamilton, OH (US)

(72) Inventors: Mark Auernheimer, Richmond, VA (US); Zachary Shepard, Cincinnati, OH (US); Jeffrey D. Cowles, St. Simons Island, GA (US)

(73) Assignee: SUGAR CREEK PACKING CO., Hamilton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/462,484

(22) Filed: Mar. 17, 2017

(65) Prior Publication Data
US 2017/0188611 A1 Jul. 6, 2017

Related U.S. Application Data

(63) Continuation-in-part of application No. 15/398,385, filed on Jan. 4, 2017.
(Continued)

(51) Int. Cl.
*A23L 5/10* (2016.01)
*A23L 13/00* (2016.01)
(Continued)

(52) U.S. Cl.
CPC ............. *A23L 13/03* (2016.08); *A23L 5/12* (2016.08); *A23L 5/17* (2016.08); *A23L 13/57* (2016.08);
(Continued)

(58) Field of Classification Search
CPC .. A23L 13/03; A23L 5/12; A23P 20/10; A23P 20/12; A23V 2002/00
See application file for complete search history.

(56) References Cited

U.S. PATENT DOCUMENTS 3,597,228 A 8/1971 Jeppson et al.
3,956,515 A * 5/1976 Moore ................ A23P 20/12
426/302

(Continued)

FOREIGN PATENT DOCUMENTS

FR 2 784 863 4/2000
GB 848014 9/1960
(Continued)

OTHER PUBLICATIONS

Kasguma, Rick. "Pork Spare Ribs #2" Mar. 17, 2012 http://blog.rickk.com/food/2012/03/pork-spare-ribs-2.html.*
(Continued)

*Primary Examiner* — Viren A Thakur
(74) *Attorney, Agent, or Firm* — Thompson Hine LLP

(57) ABSTRACT

A system for cooking pieces of protein may include a flour applicator that receives the pieces of protein in an uncooked state and applies a coating of flour to outer surfaces thereof; a batter applicator that receives the pieces of uncooked protein coated with the flour from the flour applicator and applies a batter made from high-gluten flour to the coated outer surfaces thereof; a packaging machine that receives the pieces of uncooked protein coated with the batter made from the high-gluten flour from the batter applicator and seals the pieces of protein in plastic pouches; and a heating unit that receives the sealed plastic pouches containing the uncooked protein coated with the batter from the packaging machine and cooks the battered protein pieces in the plastic pouches.

19 Claims, 2 Drawing Sheets

Related U.S. Application Data

(60) Provisional application No. 62/405,645, filed on Oct. 7, 2016.

(51) Int. Cl.
    *A23P 20/10*     (2016.01)
    *A23P 20/12*     (2016.01)
    *A23L 13/50*     (2016.01)
    *A23L 17/00*     (2016.01)

(52) U.S. Cl.
    CPC ............... *A23L 17/75* (2016.08); *A23P 20/10* (2016.08); *A23P 20/12* (2016.08); *A23V 2002/00* (2013.01)

(56) References Cited

U.S. PATENT DOCUMENTS

| | | | |
|---|---|---|---|
| 3,966,980 A | 6/1976 | McGuckian | |
| 4,054,673 A * | 10/1977 | Kaufman | A23L 5/11 426/302 |
| 4,078,517 A * | 3/1978 | Castellano | A23P 20/12 118/16 |
| 4,214,548 A | 7/1980 | Booth | |
| 4,680,186 A | 7/1987 | Sheehy et al. | |
| 4,764,386 A * | 8/1988 | Bernacchi | A23P 20/12 426/293 |
| 4,948,603 A * | 8/1990 | Bernacchi | A23P 20/12 426/238 |
| 5,008,121 A * | 4/1991 | Bernacchi | A23P 20/12 426/293 |
| 5,020,427 A * | 6/1991 | Kennefick | A23P 20/12 118/16 |
| 5,403,600 A | 4/1995 | Reutimann et al. | |
| 5,631,035 A | 5/1997 | Clarke et al. | |
| 5,702,741 A * | 12/1997 | Reutimann | A23L 13/57 426/285 |
| 6,042,871 A | 3/2000 | Cohen | |
| 6,510,810 B2 * | 1/2003 | Nothum, Sr. | A23P 20/17 118/26 |
| 8,216,510 B2 | 7/2012 | Garrett et al. | |
| 2004/0191376 A1 | 9/2004 | Kramer | |
| 2004/0262301 A1 | 12/2004 | Young et al. | |
| 2005/0008738 A1 | 1/2005 | Tarver | |
| 2005/0142257 A1 * | 6/2005 | Long | A23C 19/0912 426/302 |
| 2008/0023101 A1 * | 1/2008 | Rudesill | A23P 20/12 141/248 |
| 2008/0187630 A1 * | 8/2008 | Vimini | A23P 20/12 426/96 |
| 2010/0056628 A1 | 3/2010 | Stockel et al. | |
| 2011/0070339 A1 * | 3/2011 | O'Connor | A21D 2/165 426/108 |
| 2012/0100273 A1 | 4/2012 | Guillaud | |
| 2012/0196004 A1 * | 8/2012 | Pickford | A23P 20/12 426/95 |
| 2013/0040017 A1 * | 2/2013 | White | A23P 20/12 426/61 |
| 2014/0093627 A1 | 4/2014 | Bender | |
| 2015/0010679 A1 * | 1/2015 | Strong | A23B 4/0053 426/233 |
| 2015/0064322 A1 | 3/2015 | Guillaud | |
| 2015/0230501 A1 * | 8/2015 | Bertin | A23L 1/0067 426/89 |
| 2015/0296847 A1 | 10/2015 | James | |
| 2017/0013865 A1 | 1/2017 | Valentine | |

FOREIGN PATENT DOCUMENTS

| | | |
|---|---|---|
| GB | 2 113 522 | 8/1983 |
| GB | 2 232 572 | 12/1990 |
| GB | 2 260 071 | 4/1993 |
| JP | 2002-306133 | 10/2002 |
| WO | 88/03761 | 6/1988 |
| WO | 97/00622 | 1/1997 |
| WO | 97/05020 | 2/1997 |
| WO | 00/62632 | 10/2000 |
| WO | 2004/000039 | 12/2003 |
| WO | 2007/017542 | 2/2007 |

OTHER PUBLICATIONS

Bienvenu, Marcelle. "The art and science of battering and frying: Cooking Creole" Apr. 20, 2015 http://www.nola.com/food/index.ssf/2015/04/the_art_and_science_of_batteri.html.*
"Formech" Jan. 24, 2015 http://web.archive.org/web/20150124024656/http://formech.com/about/about-vacuum-forming/.*
5 Surprising Things You Can Sous Vide: Fried Chicken. Apr. 4, 2015 https://anovaculinary.com/sous-vide-fried-chicken/.*
Barbut, Shai. "The Science of Poultry and Meat Processing." Sep. 12, 2015 http://download.poultryandnneatprocessing.com/v01/SciPoultryAndMeatProcessing%20-%20Barbut%20-%2014%20Battering%20%26%20Breading%20-%20v01.pdf (Year: 2015).*
"Triple Dipped Fried Chicken" Sep. 4, 2015 http://web.archive.org/web/20150904042022/https://www.allrecipes.com/recipe/89268/triple-dipped-fried-chicken/ (Year: 2015).*
Jang, Jae Deok, et al.; "Development of a sous-vide packaging process for Korean seasoned beef"; Article in Food Control; DOI: 10.1016/j.foodcont.2004.03.008; 7 pages (Mar. 2005).
Díaz, Pedro et al.; "Microbial, physical-chemical and sensory spoilage during the refrigerated storage of cooked pork loin processed by the sous vide method"; DOI: 10.1016/j.meatsci.2007.12.002; pp. 287-292 (Dec. 3, 2007).
Díaz, Pedro et al.; "Determination of Shelf Life of Sous Vide Salmon (*Salmo salard*) Based on Sensory Attributes"; Journal of Food Science, vol. 74, No. 8; pp. 371-376 (2009).
"72-Hour Sous Vide Short Ribs"; Seattle Food Geek; available at http://seattlefoodgeek.com/2010/04/72-hour-sous-vide-short-ribs/, 7 pages (at least as early as Apr. 11, 2010).
Freda, Barbara; "Sous Vide Batter-Dipped Fried Chicken with Honey and Waffles"; http://recipes.anovaculinary.com/user/Barbara-freda; Anova Culinary; 5 pages (as early as Nov. 23, 2014).
Kavey Eats; "Southern Fried Chicken / Making Use of Sous Vide"; https://www.kaveyeats.com/2014/04/southern-fried-chicken-making-use-of-sous-vide.html, 4 pages (Apr. 20, 2014).
"1st time Fried Chicken: SV'ed then battered & fried"; https://www.reddit.com/sousvide/comments/44ull9/1st_time_fried_chicken_sved_then_battered_fried/?st=j1guboyk&sh=2ab3e898, 5 pages (Sep. 19, 2016).
"How do I get breading to stick to pre-cooked chicken for pan frying? —Seasoned Advice"; https://cooking.stackexchange.com/questions/13721/how-do-i-get-breading-to-stick-to-pre-cooked-chicken-for-pan-frying, 2 pages (Sep. 19, 2016).
PCT, International Search Report and Written Opinion, International Application No. PCT/US2017/055600 (dated Jan. 30, 2018).
Gallary, "This One Tip Makes Homemade Fried Chicken Way More Fun" (Jun. 12, 2014).
Dispirito, "Flash Fried Finger Lickin' Chicken" (May 2010).
"Batter Fried Chicken Fingers", http://web.archive.org/web/20130623070935/http://www.goldnplump.com/recipe/cfm?id=127 (Jun. 23, 2013).
"BakeInfo", http://web.archive.org/web/20140223073854/https://www.bakeinfo.co.nz/Facts/Bread-making/Bread-ingredients/Starch (2014).
U.S. Office Action, U.S. Appl. No. 15/398,385 (dated Feb. 15, 2019).
"Types of Wheat Flour", http://web.archive.org/web/20070220135934/https://www.recipetips.com/kitchen-tips/t--1026/tpes-or-wheat-flour.asp (2007).

* cited by examiner

SYSTEM AND METHOD FOR COOKING PIECES OF PROTEIN

TECHNICAL FIELD

The present disclosure relates to systems and methods for cooking protein, and more particularly, to systems and methods for preparing batter-coated protein pieces of meat, poultry, and fish for frying.

BACKGROUND

Fried protein, which frequently takes the form of fried chicken pieces or fried fish pieces, is a popular food. Consequently, restaurants, especially fast food and fast casual restaurants, provide such fried protein dishes on a large volume basis. Preparation of such fried protein dishes in restaurants requires that the food preparer at the restaurant handle raw protein pieces to coat the protein pieces in a batter, bread the batter-coated protein pieces, and then fry the protein pieces both to cook them and to harden the batter coating, typically to a firm or crispy crust. Many processes for frying protein pieces require the protein pieces to be coated, by dredging or immersion, with liquid batter that may include raw egg and/or other ingredients that may spoil at room temperature, or if kept too long in a refrigerated state, which may constitute a source of hygiene problems for the restaurant. In addition, coating uncooked protein pieces prior to frying creates a risk of the protein spoiling if allowed to remain at room temperature too long, or if refrigerated for too long.

Accordingly, there is a need for a system and process for preparing fried protein dishes in a manner that minimizes the chance of contamination from using batter that inadvertently may have spoiled. There is also a need for a process and system for preparing fried protein dishes that can be performed by relatively unskilled preparers, and which eliminates the need for a food preparer to handle raw, uncooked protein pieces when coating the protein pieces and when frying them. Further, there is a need for a system and process for preparing fried protein dishes that allows broad culinary options to be employed in the final preparation step.

SUMMARY

The present disclosure describes a system and method for cooking pieces of protein, such as animal protein, which includes meat, such as beef, pork, poultry, and fish, in which the protein pieces are first dusted with flour and battered, then sealed in pouches, and cooked. The pouches of cooked protein pieces then are chilled, and later shipped in a refrigerated or frozen state for later use. The end user simply removes the previously battered and cooked protein pieces from their pouches, and thaws the protein pieces if necessary. The batter, which is made from a high-gluten flour, becomes tacky again when thawed, so the end user need only bread and/or coat the protein pieces as desired, and flash fry the pieces for serving. The initial step of dusting the protein pieces with flour facilitates adhesion of the batter to the outer surfaces of the protein pieces, especially if the outer surfaces of the protein pieces are moist or wet.

The batter coating the protein pieces is selected to provide a coating that remains tacky and can accept breading and other coatings after the protein pieces are cooked in their pouches. If the cooked battered protein pieces are frozen in their pouches, when the battered protein pieces are later thawed for final preparation, the original batter coating again becomes tacky. This property of the batter eliminates the need for coating the protein pieces a second time with a batter or other tacky substance to adhere breading at the point of frying, which reduces the likelihood of contamination of the protein pieces by the batter and streamlines the food preparation process at the point of final preparation for service. The system and method also provide a precooked protein product to a food preparer that reduces the occurrence of spoiled protein pieces.

In an embodiment, a system for cooking pieces of protein includes a flour applicator that receives the pieces of protein in an uncooked state and applies a coating of flour to outer surfaces thereof; a batter applicator that receives the uncooked protein pieces coated with the flour from the flour applicator, and applies a batter made from high-gluten flour to the coated outer surfaces thereof; a packaging machine that receives the uncooked protein pieces coated with the batter made from the high-gluten flour from the batter applicator, and seals the pieces of protein in plastic pouches; and a heating unit that receives the sealed plastic pouches containing the uncooked protein pieces coated with the batter from the packaging machine and cooks the battered protein pieces in the plastic pouches.

In another embodiment, a method for cooking pieces of protein includes applying a coating of flour to outer surfaces of the protein pieces in an uncooked state; applying a batter made from high-gluten flour to the coated outer surfaces of the uncooked protein pieces; sealing in plastic pouches the uncooked protein coated with the batter made from the high-gluten flour; and cooking in the sealed plastic pouches the protein pieces coated with the batter.

In yet another embodiment, a food processing line for cooking pieces of protein includes an environmentally separated preparation room containing a flour applicator that receives the pieces of protein in an uncooked state and applies a coating of flour to outer surfaces thereof, a batter applicator that receives a batter made from high-gluten flour and coats the batter on the uncooked protein pieces coated with flour, and a packaging machine that receives the uncooked protein pieces coated with the batter and seals the uncooked protein pieces coated with the batter in plastic pouches; and an environmentally separated cooking room containing a heating unit that receives the sealed plastic pouches from the packaging machine in the preparation room and cooks the battered pieces of protein in the plastic pouches.

Other objects and advantages of the disclosed system and method for cooking pieces of protein will be apparent from the following description, the accompanying drawings, and the appended claims.

DETAILED DESCRIPTION

Figure 1:
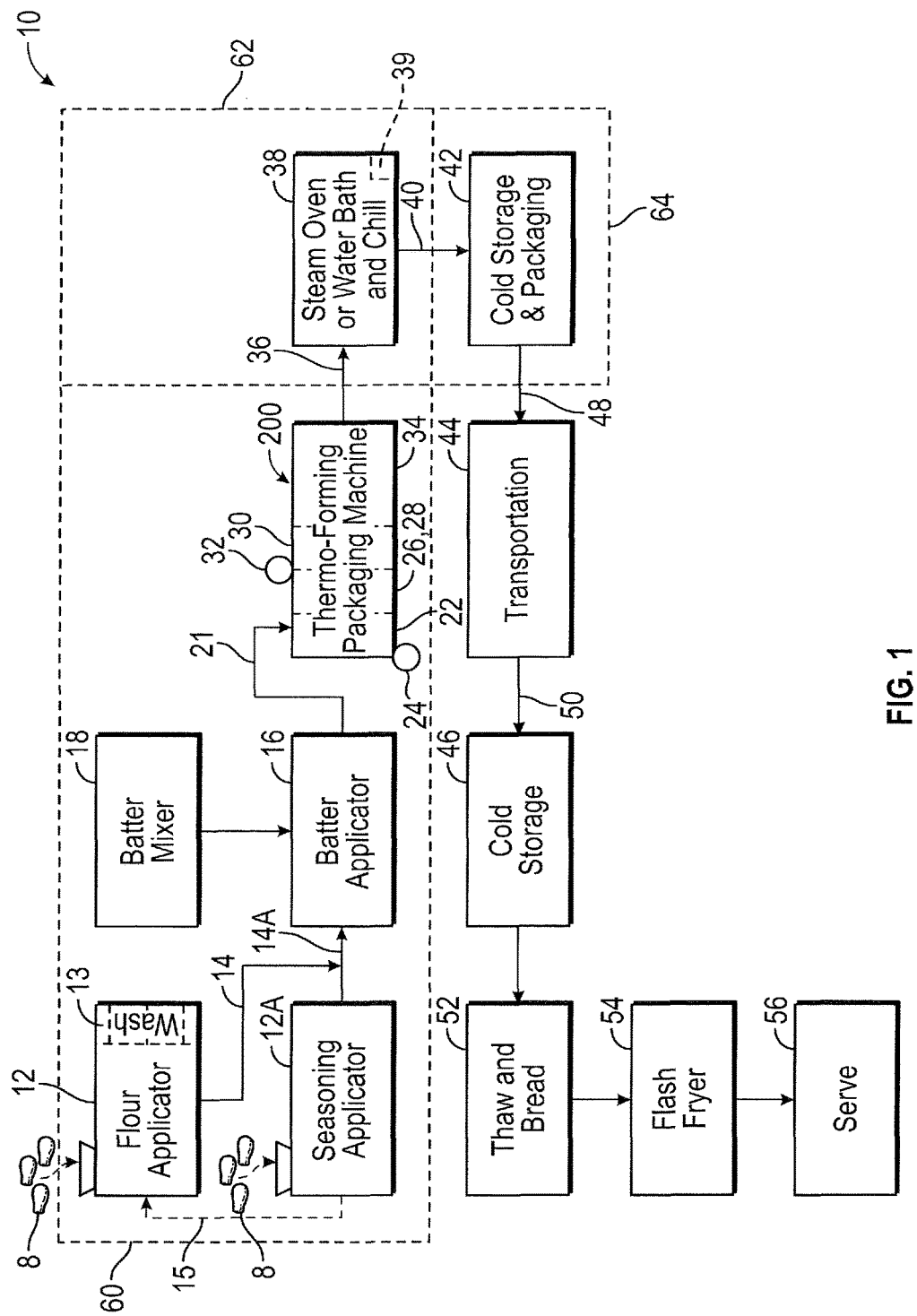
FIG. 1 is a schematic representation of an embodiment of the disclosed system for cooking pieces of protein.

As shown in FIG. 1, the system, generally designated 10, for cooking pieces of protein may include a flour applicator 12 that receives the pieces of protein 8 in an uncooked state (i.e., raw) and applies a coating of flour to outer surfaces thereof. The flour applicator 12 may receive uncooked protein pieces 8 via a conveyor (not shown), or the uncooked protein pieces may be fed or loaded manually into the flour applicator, which may include a hopper that receives the protein pieces. In embodiments, the protein pieces 8 may be animal protein, and may include whole-muscle, intact chicken pieces, other types of poultry, such as turkey and duck, or other protein such as beef, ground beef patties, pork, and whole (i.e., unshredded) fish pieces. In other embodiments, the protein may take the form of formed pieces of meat, shredded chicken, other poultry, and fish.

The flour applicator 12 may take the form of a flour duster unit, such as manufactured by Spooner Vicars of Wigan, United Kingdom, and the Alco Preduster Type ABM, manufactured by Alco-Food-Machines GmbH & Co. KG of Bad Iburg, Germany. In still other embodiments, the flour applicator 12 may take the form of a manual flour application station, a tumbler unit, and a shaker unit. The flour applicator 12 may apply flour selected from all-purpose flour, rice flour, pea flour, sorghum flour, high-gluten wheat flour, high-protein wheat flour, nut flour, soy powder, milk powder, whey powder, and mixtures thereof. The flour applicator 12 may apply any of the foregoing types of flour, or mixtures thereof, further mixed with a seasoning or seasonings selected from salt, pepper, spice or spices, flavorings, extracts, and mixtures thereof. The dusting of flour to the outer surfaces of the uncooked protein pieces 8 may facilitate or enhance the subsequent coating of the uncooked protein pieces with high-gluten batter, as will be described.

In an embodiment, the flour applicator 12 may be connected to a wash or sprayer 13 that receives the uncooked protein pieces 8 coated with flour from the flour applicator 12 and applies a layer of liquid to the outer surfaces of the uncooked protein pieces. The liquid may be selected from egg wash, egg wash substitute, oil, milk, and mixtures thereof. The sprayer 13 may be a disc sprayer, such as The Bakon USA Disc Spraying-Eggwash Sprayer manufactured by Bakon USA Food Equipment of Torrance, Calif. In other embodiments, the sprayer 13 may be selected from a spray coater and a mist coater, such as a Mistcoater SST, manufactured by Automatic Process Equipment Corp. of Lake Odessa, Mich.

In another embodiment, the flour applicator 12 receives the uncooked protein pieces 8, and applies a coating or dusting of flour on the outer surfaces of the protein pieces. The flour-coated uncooked protein pieces 8 then may be transported, either manually or by a conveyor, to the sprayer 13, where they may be sprayed with a liquid to form a liquid coating over the flour dusting layer on the outer surfaces of the uncooked protein pieces. The uncooked protein pieces 8 then may be sent through the flour applicator 12 a second time to apply a second coating or dusting of flour on the outer surfaces of the uncooked protein pieces.

Optionally, the system 10 may include a seasoning applicator 12A. The seasoning applicator 12A itself may receive the uncooked protein pieces 8, which may be by way of a conveyor (not shown) or manual loading received in a hopper, and apply a coating of seasoning on the outer surfaces of the protein pieces. The seasoning may be selected from salt, pepper, spice or spices, flavorings, extracts, and mixtures thereof. The seasoning applicator 12A may be selected from a vacuum tumbler that tumbles the protein pieces 8 with under a vacuum, a drum tumbler, and a tumble mixer. In an embodiment, the seasoning applicator 12A applies seasoning to the outer surfaces of the uncooked protein pieces 8 and in the system 10 is connected to apply the seasoning to the uncooked protein pieces prior to the protein pieces entering the flour applicator 12. In that embodiment, flour applicator 12 may receive seasoned uncooked protein pieces 8 from the seasoning applicator 12A and apply a coating of flour to outer surfaces thereof.

The system 10 may include an optional conveyor 15 that conveys the uncooked protein pieces from the seasoning applicator 12A to the flour applicator 12. The conveyor 15 may be an integral component of the seasoning applicator 12A. Alternately, the protein pieces 8 seasoned by the seasoning applicator 12A may be conveyed manually, as by trays, from the seasoning applicator to the flour applicator 12. In still other embodiments, the seasoning applicator 12A and the flour applicator 12 may be integrated into a single unit.

The uncooked protein pieces 8, dusted with a layer flour by the flour applicator 12, and optionally sprayed with a layer of liquid by wash or sprayer 13, may be conveyed from the flour applicator to the batter applicator by a first conveyor 14, or conveyed manually, such as by trays, to a batter applicator 16. In the embodiment where the uncooked protein pieces 8 are coated with a liquid by the sprayer 13, the batter applicator 16 may receive the uncooked protein pieces 8 from the sprayer, and in still other embodiments, the batter applicator may receive the uncooked protein pieces first coated with the flour, then with the layer of liquid, and finally with the second coating of flour on the outer surfaces thereof. Optionally, the batter applicator 16 may receive uncooked protein pieces 8 directly from the seasoning applicator 12A, either manually, as by trays, or by a conveyor 14A.

Figure 2:
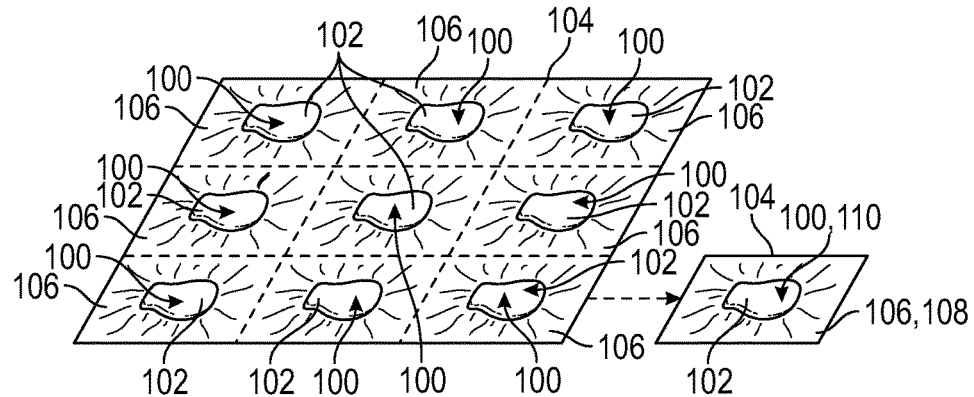
FIG. 2 is a perspective view of pieces of protein sealed by the packaging machine of the system of FIG. 1 into individual bags or pouches, showing a separated individually sealed piece of protein in a bag or pouch.

The batter applicator 16 may apply a batter 102 (see FIG. 2) made from high-gluten flour to the coated outer surfaces of the uncooked protein pieces 8, making battered uncooked protein pieces 100 (see FIG. 2). In an embodiment, the batter applicator 16 may include or consist of a BatterPro batter applicator manufactured by Nothum Food Processing Systems of Springfield, Mo., or any one or more various batter applicators, such as those manufactured by John Bean Technologies Corp. of Chicago, Ill., including the Heritage XL, APB, Rotary Drum, and T-1 models. Optionally, the batter applicator 16 may be supplied by batter from a batter mixer 18, such as a batter mixer manufactured by Nothum Food Processing Systems of Springfield, Mo. Alternatively, the batter applicator 16 may apply batter to the dusted, uncooked protein pieces 8 by dipping or drench/waterfall, and may take the form of conveyor-style, rotary drum, or batter-breading equipment. Alternatively, the application of batter to the protein pieces 8 may be done manually.

In embodiments, the batter 102 may include a mixture of flour and water, and in certain embodiments, the flour may consist of, or include, a high-gluten flour mixed with water because it will remain sticky or tacky until fried. In more specific embodiments, the flour may be selected to have between approximately 12% to 25% gluten. A high-gluten flour (often used for bread flour) that may be used is typically approximately 12% to 15% gluten. In still other embodiments, a batter made from flour of greater than approximately 15% gluten may be used.

The water-to-flour mixture for the high-gluten batter 102 may be in the range of approximately 60% water to 40% flour by volume, which may be preferred for chicken. A ratio of approximately 70% water to 30% flour by volume may be preferable for dryer proteins. Batter made from water-to-flour ratios between these two ratios also may be acceptable. In embodiments, a water-to-flour ratio of as high as 88% water to 15% water may be functional. It is preferable to use a relatively sticky, high-gluten flour. In embodiments, it may be desirable to add egg white, egg, milk, buttermilk, seasonings, soy, fish meal, meat-meal, nut meal, legume-flour, pea-flour, or other proteins, or mixtures of the foregoing, to the batter, but such additional ingredients are optional and not essential to the effectiveness of the disclosed system and method.

The system 10 also may include a packaging machine, generally designated 20, that receives the battered uncooked protein pieces 100 from the batter applicator 16 and seals the battered uncooked protein pieces in plastic pouches 106 (see FIG. 2). In an embodiment, the packaging machine 20 may take the form of a thermoforming packaging machine that vacuum seals the uncooked, battered protein pieces 100 in the plastic pouches 106. The battered uncooked protein pieces 100 may be conveyed to the packaging machine 20 by a second conveyor 21, and/or manually by carrying trays of battered uncooked protein pieces to the packaging machine. A typical thermoforming packaging machine 20 that may be employed in the system 10 is a Multivac R 530, manufactured by MULTIVAC Sepp Haggenmüller SE & Co. KG. Such a thermoforming packaging machine 20 may include a forming station 22 that receives a lower web 24 of formable sheet plastic from a roll and forms or shapes the plastic sheet by the effects of heat, compressed air and vacuum. The food-grade plastic may be selected to be heat sealable and able to withstand food cooking temperatures, such as for sous vide or steam cooking, which may range from 140° F. to 170° F. or higher, depending upon the type of protein cooked.

The pliable sheet of the lower web 24 may be conveyed to a loading area 26 of the thermoforming packaging machine 20 in which the sheet is placed into cavities on a tray shown schematically as 28 in FIG. 1. The battered uncooked protein pieces 100 are placed in the individual cavities of the tray 28 in the loading area 26, and the trays are moved to a sealing station 30 of the thermoforming packaging machine 20, where an upper web 32 of formable sheet plastic is applied on top of the lower web 24 and over the battered uncooked protein pieces 100. In an embodiment, the battered uncooked protein pieces 100 may be manually removed from the first conveyor 21 and placed into the cavities of the tray 28 of the thermoforming packaging machine 20, which may be lined with the lower web 24.

The upper and lower webs 24, 32 may be sealed hermetically to each other at the sealing station 30 by means of a seal seam to form the bags or pouches 106, each containing one or more battered uncooked protein pieces 100. The sealed bags or pouches 106 may be conveyed to a crosscutting and longitudinal cutting unit station 34 of the thermoforming packaging machine 20 where they are sliced into individual sealed plastic bags or pouches 108 (see FIG. 2), each containing one or more battered uncooked protein pieces 100. In an embodiment, air may be evacuated from the bags or pouches 106 of battered uncooked protein pieces 100 by the thermoforming packaging machine 20 such that they are vacuum sealed. In other embodiments, air may not be evacuated from the bags or pouches 106 before sealing.

As shown in FIG. 2, the individual battered uncooked protein pieces 100, which are coated on their outer surfaces with layers of the high-gluten batter 102 over the dusting of flour and/or a layer of seasoning, may be hermetically sealed within heat seal seams 104 forming individual pouches 106 by the thermoforming packaging machine 20 (FIG. 1). In embodiments, a single piece of battered uncooked protein 100 is sealed in one or more of the pouches 106; in other embodiments, more than one piece of battered protein 100 is sealed in one or more of the pouches 106. Crosscutting and longitudinal cutting unit station 34 may cut the pouches 106 into individual sealed plastic bags or pouches 108 along heat seal seams 104. The terms "in-bag" and "in-pouch," and "bag" and "pouch" each shall be used interchangeably herein.

As shown in FIG. 1, the battered uncooked protein pieces 100, sealed within the individual pouches 108 (FIG. 2), may be conveyed either manually and/or by a third conveyor 36 from the packaging machine to a heating unit, generally designated 38, that may take the form of a steam oven or a heated water bath. There, the sealed pouches 108 may be heated to cook the battered protein pieces 100 thoroughly in-pouch. Cooking temperatures may range from 140° F. to 170° F., depending upon the type of protein piece 8 cooked, and the desired texture of the protein. In one embodiment, the vacuum-formed, vacuum-sealed pouches 108 are sous vide cooked in either a steam oven or a hot water bath heating unit 38 that thoroughly and fully cooks the battered protein pieces 100 in-pouch. The temperatures and times of cooking will vary depending upon the specific type of protein to be cooked, the thickness of the battered protein pieces 100 and the type of heating unit 38 employed. In any event, the battered protein pieces 100 may be thoroughly and completely cooked sufficiently to meet food safety requirements for both private and public consumption. At the same time, the temperatures and times are selected to be below that which would harden the batter 102 coating the battered protein pieces 100.

After the in-pouch battered protein pieces 100 are thoroughly cooked, the battered cooked protein pieces 110 may be chilled. In embodiments, the battered cooked protein pieces 110 may be chilled to 40° F. The requisite chill temperature, chilling time, and the time interval between cooking and chilling the battered cooked protein pieces 110, may vary depending upon the type of protein to be chilled and United States Department of Agriculture (USDA) regulations. In embodiments, if the in-pouch cooked protein pieces 110 are cooked in a water bath, such as sous vide cooked, the cooked protein pieces may be chilled in a cold water bath in the same vessel 38. In other embodiments, such as where the heating unit 38 may take the form of a steam oven, the in-bag or in-pouch cooked protein pieces 110 may be chilled in a separate cold water bath or chilling apparatus 39, which may take the form of a tank of chilled water.

The chilled in-pouch cooked protein pieces 110 may be conveyed by a fourth conveyor 40, and/or in embodiments conveyed manually or by pallet moving equipment, to a cold storage 42. The cold storage 42 may maintain the cooked protein pieces 110 in individual pouches 108 chilled for intermediate storage duration, or alternatively, freeze the cooked battered protein pieces 110 in individual pouches 108 for longer term storage and subsequent transportation. In embodiments, the cold storage 42 may include packaging the individual in-pouch cooked protein pieces 110. Packaging may include placing predetermined numbers of the bags or pouches 108 in plastic totes, bulk boxes, and/or corrugated containers. Packing of the pouches or bags 108 may be performed either before or after freezing the chilled cooked battered protein pieces 110 in the cold storage 42. Further, the cooked and chilled battered protein pieces 110 may be flash frozen in the cold storage 42.

The cooked battered protein pieces 110, now frozen in individual pouches 108 and packaged, may be transported by a mechanism, schematically represented as 44, from the cold storage 42. The transportation mechanism 44 may take the form of a conveyor, a refrigerated truck, and/or an unrefrigerated delivery vehicle, the latter of which may require insulated containers for the bags or pouches 108. The bags or pouches 108 of frozen, cooked battered protein pieces 110 may be placed into the transportation vehicle 44 by a conveyor 48, and/or by hand-loading or loading with a loading device such as a pallet lifter or pallet truck (not shown).

When delivered to the destination, such as a remote food service facility, the containers of frozen in-bag cooked protein pieces 110 may be unloaded from the transportation vehicle 44 manually and/or by mechanical means, indicated schematically at 50, and may be stored in a destination cold storage facility or receptacle 46 that may be associated with an end user. The cold storage 46 may be a remote cold storage facility such as at a restaurant, including a fast food restaurant or a fast casual restaurant, or other food service provider. At the remote facility, when ready for consumption, a bag or bags 108 of frozen cooked protein pieces 110 may be unpacked and removed from the cold storage 46, and if necessary thawed, at which time the batter 102, because it is a high-gluten batter of the type described herein, again becomes tacky. If the bag or bags 108 of cooked protein pieces 110 are refrigerated or chilled, but not frozen, the batter 102 coating the cooked protein pieces already will be tacky. The cooked battered protein pieces 110 may be removed from their pouches 108 and hand rolled in breading or other coating, or tumbled in breading or other coating in a tumbler (not shown) at the food service facility, indicated at 52. The breading or other coating will adhere to the batter 102 coating of the cooked protein pieces 110 because it is tacky. Additional batter or other coating substances is not required at this point to get the breading or other coating to adhere to the cooked protein pieces 110.

In an embodiment, the breaded cooked protein pieces 110 then may be placed in a cooking device 54, such as a flash fryer. The flash fryer 54 may have cooking oil at a temperature of, or approximately, 400° F. or greater and the flash frying may take place for 90 seconds, or approximately 90 seconds. For larger protein pieces 110, for example a large, thick 9 oz. boneless breast portion cut from and 18 oz. chicken breast, or a large bone-in thigh, a cook temperature of approximately 325° F. to 350° F. for 150 seconds may be preferable. Cook temperatures may be from approximately 305° F. to 445° F. with multiple oil types, such as canola, vegetable shortening, cottonseed, beef tallow, and the like. In any event, the flash frying is at an oil temperature and for a time sufficient to harden the batter coating 102 and attach the second coating of breading or other particulate coating to the cooked protein piece 110, and to bring the previously cooked protein pieces 110 to serving temperature. The cooked protein pieces 110, now flash fried, are ready for serving as indicated block 56, which may be a serving table or individual plate.

In other embodiments, the cooking device 54 may take the form of a microwave oven, a convection oven, an infrared oven, or an oven with conventional resistance heating elements or gas burners. In still other embodiments, the cooking device 54 may be a skillet, a hot plate, an over-fired broiler, a chargrill, and a flat grill. In other embodiments, the cooked battered protein pieces 110 may be heated to serving temperature without breading, so that the batter coating 102 simply is hardened on the previously cooked battered protein pieces. The cooked battered protein pieces 110 also may be flash fried, then heated to serving temperature by one of the aforementioned methods, either before or after flash frying. Flash frying the cooked, battered, and breaded protein pieces 110 hardens the exterior of the protein piece and adheres the breading to the tacky batter coating 102.

In an embodiment, the system 10 for cooking pieces of protein may take the form of a food processing line that may include an environmentally separated preparation room 60 that contains the flour applicator 12, optionally the vacuum tumbler 12A, the batter applicator 16, the batter mixer 18, and the thermoforming packaging machine 20. The food processing line 10 also may include an environmentally separated cooking room 62 that contains the heating unit 38, which also may include a chill bath 39, and an environmentally sealed cold room 64 containing the cold storage 42. Each of the preparation room 60, the cooking room 62 and the cold room 64 may be environmentally separated, which may include individually atmospherically and structurally isolating them from the ambient environment and from each other to effectively prevent any contamination from occurring.

The first conveyor 14 may convey the uncooked protein pieces 8 from the flour applicator 12 to the batter applicator 16 in the preparation room 60. The second conveyor 21 may convey the uncooked pieces of protein 100 coated or battered with high-gluten flour from the batter applicator 16 to the thermoforming packaging machine 20 in the preparation room 60. The third conveyor 36 may convey the battered uncooked protein pieces 100, sealed in separated, individual plastic pouches 108, from the thermoforming packaging machine 20 in the preparation room 60 to the heating unit 38 in the cooking room 62. The fourth conveyor 40 may convey the cooked battered pieces of protein 110, sealed in separated plastic pouches 108, from the heating unit 38 in the cooking room 62 to the cold storage 42 in the cold room 64. The third conveyor 36 and fourth conveyor 40 may pass through the walls separating the preparation room 60 and the cooking room 62, and the cooking room and the cold room 64, respectively, through openings that restrict air passage between the rooms.

Thus, the flour applicator 12, optional vacuum tumbler 12A, batter applicator 16, and thermoforming packaging machine 20 may be series connected by the first conveyor 14, 14A and the second conveyor 21, respectively, in preparation room 60. The heating unit 38 may be series connected to the thermoforming packaging machine 20 by way of the third conveyor 36, and the cold storage 42 may be series connected to the heating unit 38 by way of the fourth conveyor 40. Thus, the vacuum tumbler 12, the first conveyor 14, the batter applicator 16, the second conveyor 21, the thermoforming packaging machine 20, the third conveyor 36, the heating unit 38, the fourth conveyor 40, and the cold storage 42 may be series connected in that order, as shown in FIG. 1.

Figure 3:
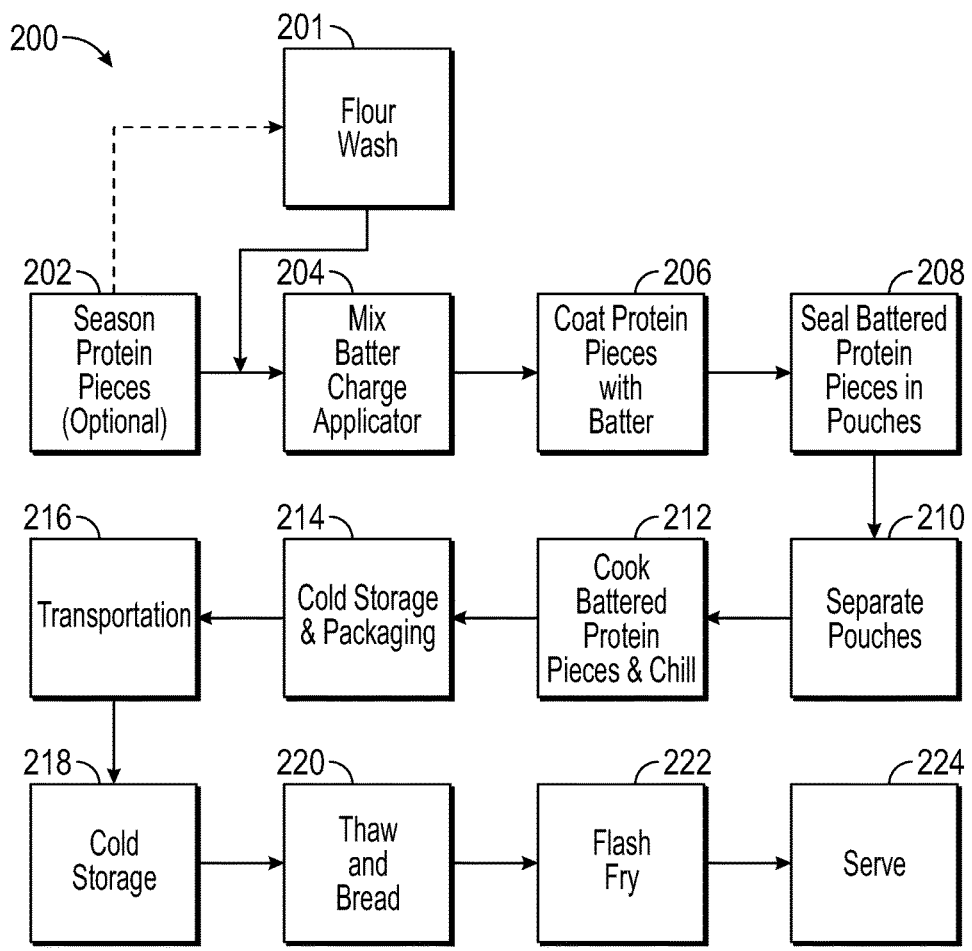
FIG. 3 is a flow chart showing an embodiment of the disclosed method for cooking pieces of protein.

As shown in FIG. 3, the foregoing system 10 provides a process 200 for cooking battered pieces of protein 100 that may be stored in a cold storage 42 and later breaded and flash fried without the addition of batter at the time of flash frying. As indicated in block 201, the process 200 may begin by loading uncooked protein pieces 8 (FIG. 1) into a flour applicator 12, which may be by batch mode or continuous mode, which applies coating of flour to outer surfaces of the protein pieces in an uncooked state. The step of block 201 optionally may include a step of mixing spices with the flour that is coated or dusted onto the uncooked protein pieces 8. Also as indicated in block 201, optionally, the uncooked protein pieces 8 may be washed by a wash or sprayer 13 that applies a layer of liquid to the outer surfaces of the uncooked protein pieces after applying the coating of flour. The liquid may be selected from egg wash, egg wash substitute, milk, oil, liquid flavoring, and mixtures thereof. Block 201 also may include a step of applying a second coating of flour to the outer surfaces of the uncooked protein pieces 8 after applying the layer of liquid.

As indicated in block 202, optionally, the process 200 may begin by placing uncooked protein pieces 8 in a seasoning applicator 12A, such as a vacuum tumbler (see FIG. 1) to coat the protein pieces 8 with seasoning. The process may continue with the seasoned uncooked protein pieces 8 being conveyed to the flour applicator 12 described in reference to block 201.

As shown in block 204, a high-gluten batter 102 may be prepared in the batter mixer 18, and the batter is charged into the batter applicator 16. As indicated in block 206, the uncooked protein pieces 8, which have been dusted by flour applicator 12 and optionally washed by sprayer 13, may be conveyed by the first conveyor 14 to the batter applicator 16 and coated with batter 102 in the applicator. Alternatively, uncooked protein pieces 8 may be placed directly into the batter applicator 16 and coated with batter 102 without having been seasoned, dusted with flour, or washed or sprayed. In embodiments, the process steps in blocks 201 and 204 may be performed sequentially in the order shown in FIG. 3, or performed simultaneously, or performed in reverse order shown. It also is within the scope of the disclosure to perform these and other steps of process 200 continuously and/or in batch mode.

As indicated in block 208, the uncooked battered protein pieces 100 may be conveyed by the second conveyor 21 to the thermoforming packaging machine 20, wherein the uncooked battered protein pieces are sealed, in embodiments vacuum sealed, in individual pouches 106 in a sheet, and are separated into individual pouches 108, as indicated in block 210. As indicated in block 212, the in-pouch cooked battered protein pieces 110 are conveyed by the third conveyor 36 to cooking device 38, such as a steam oven or heated water bath, where the battered protein pieces are thoroughly cooked in-pouch, such as by sous vide cooking. The cook temperature is below the temperature that would harden the high-gluten batter 102. After cooking, the in-pouch cooked and battered protein pieces 110 may be chilled, which may be in the chilled water bath 39, or the chilled water may be introduced into the same vessel used for the hot water bath that cooks the protein pieces 110.

As indicated in block 214, the in-bag or in-pouch cooked battered protein pieces 110, now chilled, may be stored in cold storage 42, in which they may be frozen or maintained chilled without freezing. At this time, the pouches 108 may be packaged in containers, such as totes, bulk boxes, and/or corrugated cases. The packaging of pouches 108 may take place after the chilling of the protein pieces 110 and either before or after freezing in the cold storage 42. Predetermined numbers of pouches 108 may be packaged in containers as desired, for example, to fulfill customer orders, or in predetermined assortments or groupings. As indicated in block 216, the packages of pouches 108 later may be transported to a restaurant or other food service facility by a vehicle 44.

As indicated in block 218, the containers of pouches 108 of frozen or chilled cooked battered protein pieces 110, may be stored in cold storage 46 at the point of delivery for use as needed by the restaurant or food service facility. As indicated in block 220, when needed, one or more pouches 108 of cooked battered protein pieces 110 may be unpacked from their containers, thawed or warmed, and the protein pieces removed from their pouches. If the pouches 108 have been chilled and not frozen, the batter 102 on the cooked protein pieces 110 is tacky when the cooked battered protein pieces are removed from their pouches. If the cooked battered protein pieces 110 have been frozen, the batter 102 will become tacky when the cooked battered protein pieces thaw. In either case, the cooked battered protein pieces 110 may be removed from their pouches 108, and because of the tacky coatings of batter 102 of high-gluten flour, breaded with a breading of choice, which may be selected from any number of predetermined breading formulations, without need of an additional coating of batter or other substance to make the breading adhere to the cooked battered protein pieces 110.

As indicated in block 222, the cooked battered protein pieces 110, now breaded, may be placed in a cooking device, such as the flash fryer 54, and flash fried to harden or make crisp the batter 102 and breading. Since the protein pieces 110 are already cooked, it is only necessary to flash fry the protein pieces sufficiently to harden the batter and warm the protein pieces to a predetermined serving temperature. As indicated in block 224, the flash fried protein pieces 110 then may be served to a consumer, who may be a patron of the restaurant.

The advantage of the process 200 is that it provides pre-cooked protein to a food service facility, such as a restaurant, which may be a fast food restaurant or a fast casual restaurant, so that the food service facility workers are relieved from handling raw or partially cooked protein, thereby minimizing the likelihood of contamination or spoilage of the protein or batter. At the same time, the protein pieces may be advertised as being hand breaded by the restaurant workers at the location of the restaurant. The flour applicator 12 may provide a light dusting of flour on the uncooked protein pieces 8 that may facilitate the adherence of the high gluten batter 102 to the uncooked protein pieces, especially if the uncooked protein pieces are moist on their outer surfaces.

While the forms of apparatus and methods described herein constitute preferred embodiments of the disclosed system and process for cooking pieces of protein, it is to be understood that the disclosure is not limited to these precise systems and methods, and that changes may be made therein without departing from the scope of the disclosure.

What is claimed is:

1. A method for cooking pieces of protein, the method comprising:
    applying a coating consisting of flour to outer surfaces of uncooked protein pieces, resulting in coated uncooked protein pieces;
    applying a batter consisting of a mixture of flour containing gluten and water to the coated uncooked protein pieces, resulting in battered uncooked protein pieces consisting of the uncooked protein pieces, the coating and the batter;
    sealing the battered uncooked protein pieces in plastic pouches; and
    cooking the sealed battered uncooked protein pieces, while in the sealed plastic pouches, at a temperature and time selected to completely cook the protein pieces, whereby the batter is sufficiently tacky such that breading can adhere thereto.

2. The method of claim 1, further comprising removing the completely cooked, battered pieces of protein from the plastic pouches, wherein the batter is tacky; applying a breading that attaches to the tacky batter of the completely cooked, battered pieces of protein; and flash frying the breaded, completely cooked, and battered pieces of protein.

3. The method of claim 2, wherein flash frying the breaded, completely cooked, and battered pieces of protein includes flash frying the breaded, completely cooked, and battered pieces of protein sufficiently to harden the batter coating with the attached breading.

4. The method of claim 1, further comprising chilling or freezing the cooked, battered protein pieces in the pouches.

5. The method of claim 1, further comprising removing the cooked, battered protein pieces from the plastic pouches; breading the cooked, battered protein pieces; and further cooking the breaded, cooked, battered protein pieces in a cooking device selected from a flash fryer, a microwave oven, a convection oven, an infrared oven, an oven with resistance heating elements, an oven with gas burners, a skillet, a hot plate, an over-fired broiler, a chargrill, and a flat grill.

6. The method of claim 1, wherein cooking in the sealed plastic pouches the protein pieces includes sous vide cooking the uncooked protein pieces, the coating, and the batter in the plastic pouches.

7. The method of claim 1, wherein the applying of the batter consisting of flour containing gluten mixed with water includes applying a batter consisting of flour selected from flour containing 12% to 25% gluten, 12% to 15% gluten, and greater than 15% gluten mixed with water.

8. The method of claim 1, wherein the sealing in the plastic pouches of the battered uncooked protein pieces includes vacuum sealing the plastic pouches.

9. A method for cooking pieces of protein in a food processing line, the method comprising:
applying a coating to outer surfaces of uncooked protein pieces in a preparation room isolated from an ambient environment, the coating consisting of flour and optionally seasoning;
applying a batter consisting of a mixture of flour containing gluten and water to the coated outer surfaces of the uncooked protein pieces by a batter applicator in the preparation room, resulting in battered uncooked protein pieces consisting of the uncooked protein pieces, the coating and the batter;
receiving the battered uncooked protein pieces from the batter applicator and sealing the battered uncooked protein pieces in plastic pouches using a thermoforming packaging machine in the preparation room; and
completely cooking the sealed battered uncooked protein pieces in the plastic pouches in a heating unit in a cooking room isolated from an ambient environment at a temperature and time whereby after completely cooking the protein pieces the batter is sufficiently tacky such that breading can adhere thereto.

10. The method of claim 9, wherein the sealing in plastic pouches includes vacuum-sealing in plastic pouches the battered uncooked protein pieces; and wherein the cooking of the battered uncooked protein pieces is in the vacuum-sealed plastic pouches.

11. The method of claim 9, further comprising making the batter consisting of the mixture of flour and water in a batter mixer in the preparation room, and the batter applicator is connected to the batter mixer to receive the batter from the batter mixer.

12. The method of claim 9, further comprising chilling the plastic pouches with the cooked, battered pieces of protein in a cold storage located in a cold room isolated from an ambient environment.

13. The method of claim 9, further comprising connecting the flour applicator, the batter applicator, and the thermoforming packaging machine in series using conveyors there-between.

14. The method of claim 13, further comprising connecting the heating unit to the thermoforming packaging machine in series using conveyors there-between.

15. The method of claim 14, further comprising conveying the battered uncooked protein pieces from the batter applicator to the thermoforming packaging machine in the preparation room by a first conveyor; conveying the sealed battered uncooked protein pieces from the thermoforming packaging machine in the preparation room to the heating unit in the cooking room by a second conveyor; and conveying the cooked, battered pieces of protein sealed in the plastic pouches from the heating unit in the cooking room to the cold storage in the cold room by a third conveyor.

16. A method for cooking pieces of protein, the method comprising:
applying a coating to outer surfaces of uncooked protein pieces, the coating consisting of flour optionally mixed with spices, resulting in coated uncooked protein pieces;
applying a batter consisting of a mixture made from flour containing gluten and water, and optionally egg, milk, buttermilk, seasonings, soy or fish meal, meat-meal, nut meal, legume-flour, pea-flour or mixtures thereof to the coated outer surfaces of the uncooked protein pieces, resulting in battered uncooked protein pieces consisting of the uncooked protein pieces, the coating and the batter;
sealing the battered uncooked protein pieces in plastic pouches, thus resulting in sealed battered uncooked protein pieces;
and completely cooking the sealed battered uncooked protein pieces at a temperature and time selected, whereby after completely cooking the pieces of protein, the batter coating the completely cooked protein pieces is sufficiently tacky such that breading can adhere thereto.

17. The method of claim 16, wherein applying the coating to the outer surfaces of the uncooked protein pieces includes applying the coating by one of manually applying the coating, a tumbler unit, a duster unit, or a shaker unit.

18. The method of claim 16, wherein the flour used for the applying of the coating to the outer surfaces of the uncooked protein pieces is selected from all-purpose flour, rice flour, pea flour, sorghum flour, wheat flour containing gluten, high-protein wheat flour, nut flour, soy powder, milk powder, whey powder, and mixtures thereof.

19. The method of claim 16, wherein applying the coating to the outer surfaces of the uncooked protein pieces includes applying the coating consisting of the flour mixed with spices, the spices selected from salt, pepper, spice or spices, flavorings, extracts, and mixtures thereof.

* * * * *